United States Patent [19]

Sumner et al.

[11] Patent Number: 5,857,014

[45] Date of Patent: Jan. 5, 1999

[54] SYSTEM AND METHOD FOR ESTABLISHING COMMUNICATIONS BETWEEN A REMOTE COMPUTER AND A COMPUTER SERVICE PROVIDER USING A TELEPHONIC SWITCH

[75] Inventors: Roger A. Sumner, Batavia, Ill.; Jim F. Martin, Palo Alto, Calif.; Paul E. Van Berkum, Winfield, Ill.

[73] Assignee: Rockwell International Corporation, Costa Mesa, Calif.

[21] Appl. No.: 657,138

[22] Filed: May 31, 1996

[51] Int. Cl.$^6$ .................................................. H04M 11/00
[52] U.S. Cl. ........................................ 379/93.02; 379/265
[58] Field of Search ............................. 379/93.02, 93.03, 379/93.09, 93.12, 67, 88, 89, 197, 188, 196, 198, 200, 201, 243, 127, 135, 199, 308, 265, 266, 309, 142

[56] References Cited

U.S. PATENT DOCUMENTS

| | | | |
|---|---|---|---|
| 4,645,873 | 2/1987 | Chomet | 379/93 |
| 5,003,595 | 3/1991 | Collins et al. | 379/93.02 |
| 5,027,400 | 6/1991 | Baji et al. . | |
| 5,109,408 | 4/1992 | Greenspan et al. | 379/197 |
| 5,241,588 | 8/1993 | Babson, III et al. | 379/201 |
| 5,283,731 | 2/1994 | Lalonde et al. | 379/88 |
| 5,291,551 | 3/1994 | Conn et al. | 379/265 |
| 5,459,780 | 10/1995 | Sand | 379/265 |
| 5,515,424 | 5/1996 | Kenney | 379/96 |
| 5,530,744 | 6/1996 | Charalambous et al. | 379/265 |
| 5,537,470 | 7/1996 | Lee | 379/266 |

*Primary Examiner*—Wing F. Chan
*Attorney, Agent, or Firm*—Welsh & Katz, Ltd.

[57] ABSTRACT

A system 100 and method for interconnecting a remote computer 102 and a computer service provider 104 via a telephonic switch 122 is provided. The telephonic switch 122 connects the remote computer 102 to the computer service provider 104 based on information received from the remote computer 102. An adult material circuit 126 in the telephonic switch 122 detects a request from the remote computer 102 to prohibit access to adult material available on the computer service provider 104. The request may be contained in automatic number identification information or dialed number identification service information. The telephonic switch 122 further comprises a caller prompting circuit 132 which prompts the remote computer 102 for instructions regarding whether to deny access to adult material. An advertising circuit 136 in the telephonic switch 122 stores advertisements, selects one of the advertisements based on the information received from the remote computer 102 and displays the selected advertisements on the remote computer 102. The telephonic switch 122 further comprises an audio circuit 140 for establishing voice communications between a subscriber associated with the remote computer 102 and an agent telephonic unit 142 associated with the telephonic switch 122. While voice communications are established between the subscriber and the agent telephonic unit 142, a data link circuit 141 maintains a data connection between the telephonic switch 122 and the computer service provider 104 such that data communications are substantially automatically reestablished upon completion of the voice communications.

25 Claims, 1 Drawing Sheet

SYSTEM AND METHOD FOR ESTABLISHING COMMUNICATIONS BETWEEN A REMOTE COMPUTER AND A COMPUTER SERVICE PROVIDER USING A TELEPHONIC SWITCH

BACKGROUND OF THE INVENTION

The present invention relates generally to on-line computer service providers and, more particularly, to a system and method for selectively connecting remote computers to on-line computer service providers through a telephonic switch.

On-line computer service providers, such as America On-Line, Prodigy and the like, have grown at prolific rates. The computer service providers are experiencing difficulty in handling this increasing membership. In particular, the computer servers and the other computer devices used to access the services are frequently being overloaded. As a result, some subscribers may be unable to gain access to a service or when access is obtained, may experience slow responses.

Prior computer service providers use a plurality of computer servers to connect subscribers to a service. The computer servers are interconnected by wide area networks (WANs). When a subscriber attempts to access a service, a modem in the subscriber's computer dials a designated telephone number which is transmitted over a telephone system. As is well known, the telephone system is comprised of a number of interconnected central offices (CO) which route calls. From a central office, the call is routed to a terminal server. Typically, the terminal server receives signals over 60–120 analog lines from a CO. From the terminal server, the call is transmitted to one of the computer servers. The call may be then transferred between one or more computer servers over the WAN.

Unfortunately, the capabilities of these prior systems are limited. If all of the analog lines from one of the COs are in use, for example, the subscriber receives a busy signal even though one or more computer servers may be capable of handling the call. Further, any one or more of the terminal servers or the computer servers may be overloaded resulting in sluggish responses.

A significant concern for parents is the access of children to adult materials available from the computer services. To remedy these concerns, computer service providers attempt to screen adult materials from subscribers who request such screening. Unfortunately, prior system designs are not readily adapted to provide such screening. Typically, one or more of the computer servers includes a "firewall" for blocking adult material. To be connected to a computer server having a firewall, a subscriber may need to be transferred between one or more computer servers over the WAN. This is a very inefficient use of resources since some of the computer servers are being used only to transfer the subscriber.

Prior systems are further not conducive to purchasing goods advertised by a computer service provider. After viewing an advertisement, a subscriber usually must disconnect their computer from the telephone network and call the advertising company over the telephone to purchase products. This is especially true since computer users are reluctant to transmit credit card numbers over a computer network due to security concerns. Consequently, subscribers must make an additional telephone call before purchasing products and, in the process, loose their data connection to the computer service provider.

Accordingly, there is a need in the art for a system and method for connecting a remote computer to a computer service provider wherein a telephonic switch selectively connects the remote computer to a computer server associated with the desired computer service provider and wherein the telephonic switch establishes voice communications between a subscriber of the computer service provider and an agent telephonic unit while maintaining a data connection with the computer service provider.

SUMMARY OF THE INVENTION

This need is met by a system and method in accordance with the present invention wherein a telephonic switch, such as an automatic call distributor, selectively connects remote computers to computer service providers. The telephonic switch advantageously provides intelligent routing of calls from the remote computers to the computer service providers. By intelligently routing the calls, the telephonic switch can decrease the likelihood that a subscriber will experience a busy signal or receive sluggish responses from the computer service provider. By using the telephonic switch to intelligently connect to the computer service provider restricting the availability of adult materials on the provider is more readily accomplished.

In accordance with one aspect of the present invention, a system comprises a remote computer and a computer service provider for providing computer services. A subscriber accesses the computer service provider via the remote computer. The subscriber enters the appropriate commands in the remote computer requesting to connect to the computer service provider. In response, the remote computer transmits information to a telephonic switch which selectively connects the remote computer to the computer service provider based on the information.

The information received from the remote computer relates to the routing of the connection between the remote computer and the computer service provider. For example, the information may contain automatic number identification information or dialed number identification system information. A prompting circuit in the telephonic switch may prompt the subscriber for information. Using this information, the telephonic switch connects the remote computer to the computer service provider.

The subscriber may want to restrict access to adult materials available on the computer service provider. A request for restricted access to adult materials is transmitted from the remote computer to the telephonic switch. An adult material circuit in the telephonic switch detects the request to prohibit access to adult material from the remote computer. Thereafter, the telephonic switch connects the remote computer to the computer service provider based on the request. The request may be a particular ANI or DNIS number received from the remote computer. For example, the telephonic switch may store a plurality of ANI and/or DNIS numbers which desire restricted access to adult materials. The subscriber may also input instructions to restrict access or be prompted for such instructions. A caller prompting circuit prompts instructions from the remote computer whether to prohibit access to adult material.

A reporting system generates reports related to connection of the remote computer to the computer service provider. By analyzing these reports, the computer service provider can allocated resources among different areas based on frequency of use, times of use and the like. An advertising circuit associated with the telephonic switch stores at least one advertisement and selects one or more of the at least one advertisement. The advertising circuit then displays the selected one of the at least one advertisement to the remote computer based on the information received from the remote computer. As is well known, the advertisements may be audio, video or a combination of both.

The system further permits the subscriber to maintain a data connection with the computer service provider while establishing voice communications with an agent associated with the telephonic switch. An audio circuit associated with the telephonic switch establishes voice communications between the agent and the remote computer. A data link circuit maintains the data connection between the telephonic switch and the computer service provider while voice communications are established between the telephonic unit and the agent.

To talk to the agent through the telephonic switch, the subscriber picks up a telephone, or telephonic unit. If the remote computer has the capability of receiving and transmitting voice signals, the telephonic switch would then connect the remote computer to the agent. In either method, the telephonic switch could maintain the data connection with the computer service provider.

In accordance with another aspect of the present invention, a method for interconnecting a remote computer and a computer service provider is provided. The method comprises the steps of detecting by a telephonic switch information received from the remote computer and connecting the remote computer to the computer service provider by the telephonic switch based on the information. The method may further comprise the step of determining from the information whether access to adult materials should be denied. With respect to access to adult materials, the method may comprise the steps of prompting the remote computer for instructions indicating whether access to adult materials should be denied and connecting the remote computer to the computer service provider based on the instructions.

In accordance with yet another aspect of the present invention, a telephonic switch interconnects a subscriber associated with a remote computer and a computer service provider. The telephonic switch comprises a detection circuit for detecting information received from the remote computer requesting connection to the computer service provider. A routing circuit connects the remote computer to the computer service provider based on the information. The detection circuit may comprise an adult material circuit for detecting a request to prohibit access to adult material from the remote computer. The routing circuit then connects the remote computer to the computer service provider based on the request.

These and other features and advantages of the present invention will become apparent from the following detailed description, the accompanying drawings and the appended claims.

DETAILED DESCRIPTION OF THE DRAWINGS

Figure 1:
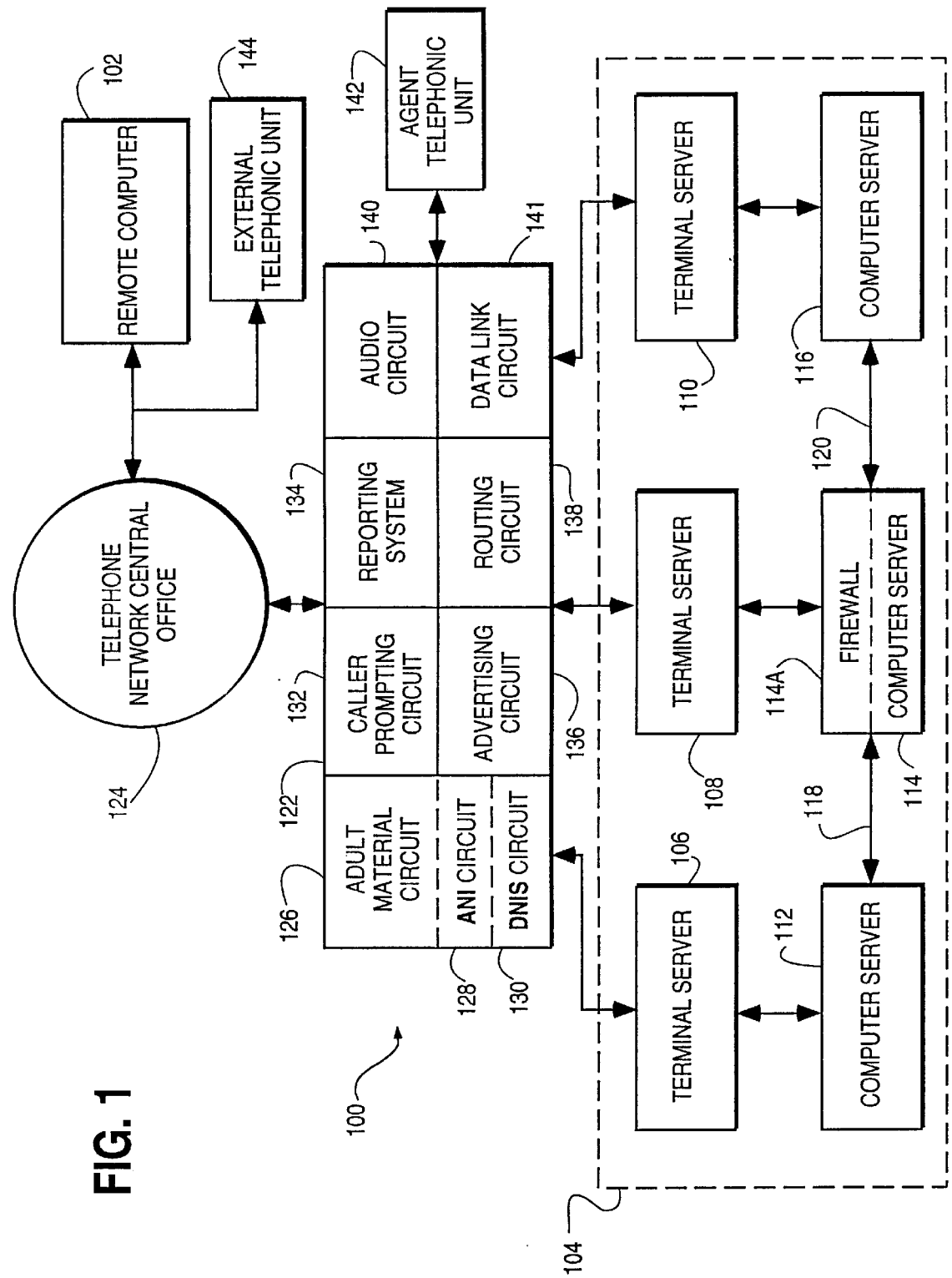

FIG. 1 is a block diagram of a system in accordance with the present invention which uses a telephonic switch to intelligently interconnect a remote computer and a computer service provider.

DETAILED DESCRIPTION OF THE INVENTION

A system 100 is shown in FIG. 1 for interconnecting a remote computer 102 and a computer service provider 104. The computer service provider 104 is shown for exemplary purposes as being implemented by a network of terminal servers 106, 108 and 110 and computer servers 112, 114 and 116. The computer servers 112, 114 and 116 are interconnected via a wide area network (WAN), represented by lines 118 and 120. The computer server 114 includes a firewall 114a for restricting access to adult materials. A telephonic switch 122, such as an automatic call distributor, routes signals from a telephone network central office (CO) 124 to the computer service provider 104. The CO 124 represents a telephone switching network which may contain one or more COs and other switching devices for routing telephone calls to the telephonic switch 122. Although not shown, a telephone network, or CO, may be interposed between the telephonic switch 122 and the computer service provider 104 in a well known manner. It should be further understood that the illustrated configuration of the computer service provider 104 is exemplary and different configurations may be advantageously employed in the invention. For example, the computer service provider 104 may be differently configured, such as comprising only computer servers 112, 114 and 116.

During operation, the telephonic switch 122 receives signals, or a signal, from the remote computer 102 requesting access to the computer service provider 104. The signals typically comprises at least a telephone number associated with the telephonic switch 122 and/or the computer service provider 104. As will be discussed more fully below, additional information may also be contained in the signals. The telephonic switch 122 processes the information contained in the signals and, based on the information, connects the remote computer 102 to the computer service provider 104.

The telephonic switch 122 typically comprises a central processing unit, a memory and a multiport switch. Exemplary switches which may be advantageously implemented in the present invention are disclosed in U.S. Pat. No. 5,452,348, entitled "Automatic Call Distribution System with Emergency Conferencing and Method" issued on Sep. 19, 1995 to Adams et al. and U.S. Pat. No. 5,384,841, entitled "Automatic Call Distribution Network with Call Overload System and Method" issued on Jan. 24, 1995 to Adams et al., the disclosures of which are hereby incorporated by reference. As is well known, software-based routing vectors are stored in the memory and are executed by the central processing unit. The multiport switch routes incoming calls based on the routing vectors. By appropriately programming the routing vectors, the telephonic switch 122 can route calls to efficiently utilize the resources of the computer server provider 104. Typically, such routing vectors route calls to agents, or agent groups, having particular skills. In the present invention, the computer service provider 104, and more particularly, the computer servers 112, 114 and 116 are considered agents for routing purposes. Since the structure and philosophy of the routing vectors are heavily dependent upon the exact configurations of the telephonic switch 122 and the computer service provider 104 and can be readily developed by those skilled in the art for a particular application, exact details of such routing vectors will not be further disclosed herein. Those desiring additional information regarding routing vectors are referred to U.S. Pat. No. 5,335,269, entitled "Two Dimensional Routing Apparatus in an Automatic Call Director-Type System" issued to Steinlicht on Aug. 2, 1994 which is incorporated herein by reference.

In the present invention, the telephonic switch 122 comprises an adult material circuit 126 for detecting a request to prohibit access to adult material from the remote computer 102. Frequently, parents wish to prohibit their children from having access to adult materials. The request from the remote computer 102 to restrict access to adult materials may be performed in a number of manners.

The request may comprise automatic number identification (ANI) information that is detected by an ANI circuit 128 included in the adult material circuit 126. When one or more designated ANI numbers are detected, the telephonic switch 122 routes the call to the computer server 114 containing the firewall 114*a* via the terminal server 108. The telephonic switch 122 comprises a dialed number identification service (DNIS) circuit 130 for detecting the request contained in DNIS information.

Alternatively, the telephonic switch 122 may prompt the caller for additional information or instructions. A caller prompting circuit 132 in the telephonic switch 122 prompts instructions from the remote computer 102. For example, the caller prompting circuit 132 may inquire whether the subscriber wishes to prohibit access to adult materials. The adult material circuit 126 then blocks access to adult material based on the instructions from the subscriber. The caller prompting circuit 132 may be comprised of a voice response unit (VRU) or other known device for providing voice communications with a caller.

The telephonic switch 122 may include a reporting system 134 for generating reports related to connection of the remote computer 102 to the computer service provider 104. As those skilled in the art will readily comprehend, the reporting system 134 may comprise any number of information gathering and displaying devices, such as dedicated terminals or printers. Computer service providers may advantageously use these reports to more efficiently utilize their resources. Based on these reports, a computer service provider may decide that an additional computer server having a firewall may be needed because of increased requests for blocking adult materials.

The telephonic switch 122 further comprises an advertising circuit 136 for presenting advertisements to subscribers as they are being connected to computer services. The advertising circuit 136 stores one or more advertisements. The advertisement, or advertisements, played for any particular subscriber is selected based on the service the subscriber is accessing. As noted above, the service which the subscriber is accessing may be identified by any of a number of methods, like ANI information or prompting the caller for information. After selecting one or more advertisements, the advertising circuit 136 then plays the selected advertisements to the remote computer 102.

A method for interconnecting the remote computer 102 and the computer service provider 104 is also provided in the invention. The telephonic switch 122 detects the signals requesting connection to the computer service provider 104. The information contained in the signals is detected by the telephonic switch 122. Based on the information, the telephonic switch 122 connects the remote computer 102 to the computer service provider 104. The information may be included in ANI information or DNIS information.

In accordance with another aspect of the present invention, the telephonic switch 122 interconnects the remote computer 102 and the computer service provider 104. The telephonic switch 122 comprises a detection circuit for detecting signals from the remote computer 102 requesting connection to the computer service provider 104 and a routing circuit 138 for connecting the remote computer 102 to the computer service provider 104 based on the signals. The detection circuit may comprise the adult material circuit 126 for detecting a request to prohibit access to adult material from the remote computer 102.

Additionally, a subscriber who is connected to the computer service provider 104 may establish a voice connection with an agent via an audio circuit 140 in the telephonic switch 122 without losing the data connection, or data link, to the computer service provider 104. For example, a subscriber may want to order a product advertised by the computer service provider 104. However, the subscriber wishes to give a credit card number to an agent at an agent telephonic unit 142 over an external telephonic unit 144. In such a case, a data link circuit 141 maintains a data connection with the computer service provider 104 while the audio circuit 140 establishes audio communications with the agent 142. As is known, the data link circuit 141 may maintain the data connection by any of a number of methods, such as periodically sending signals to the computer service provider 104.

The subscriber can then use the external telephonic unit 144 to talk to the agent telephonic unit 142. After hanging up the external telephonic unit 144, the telephonic switch 122 then reconnects the remote computer 102 to the computer service provider 104. As those skilled in the art will readily comprehend, the telephonic switch 122 does not have to maintain the data connection while the subscriber is talking to the agent telephonic unit 142. The telephonic switch 122 may disconnect the data connection while the agent telephonic unit 142 and subscriber are talking and then reestablish the data connection when the subscriber stops talking to the agent.

If the remote computer 102 has the capability of receiving video/voice communications over a data link, the telephonic switch 122 could then establish a data link with the agent telephonic unit 142. Voice and video communications would then be sent over the data link from the agent telephonic unit 142 to the remote computer 102 via the telephonic switch 122. Once again, the telephonic switch 122 may, or may not, maintain the data link with the computer service provider 104 while the subscriber and the agent communicate.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A system comprising:

a remote computer;

a computer service provider for providing computer services, the computer service provider including a plurality of computer servers; and a telephonic switch of an automatic call distributor for receiving agent selection information from the remote computer and for connecting the remote computer to a selected computer server of the plurality of computer servers of the computer service provider through a local connection of the telephonic switch with the selected computer server based on the information.

2. The system as recited in claim 1 wherein the telephonic switch comprises an adult material circuit for detecting a request to prohibit access to adult material from the remote computer, and wherein the telephonic switch connects the remote computer to the computer service provider based on the request.

3. The system as recited in claim 2 wherein the adult material circuit comprises an automatic number identification circuit for detecting the request contained in automatic number identification information.

4. The system as recited in claim 2 wherein the adult material circuit comprises
a dialed number identification service circuit for detecting the request contained in dialed number identification service information.

5. The system as recited in claim 1 wherein the telephonic switch comprises
a caller prompting circuit for prompting instructions from the remote computer whether to deny access to adult material; and
an adult material circuit for blocking access to adult material based on the instructions.

6. The system as recited in claim 1 wherein the telephonic switch comprises
a reporting system for generating reports related to connection of the remote computer to the computer service provider.

7. The system as recited in claim 1 wherein the telephonic switch comprises
an advertising circuit for storing at least one advertisement, for selecting one of the at least one advertisement and for displaying the selected one of the at least one advertisement to the remote computer based on the information.

8. The system as recited in claim 1 wherein the computer service provider comprises:
a plurality of terminal servers for interconnecting the telephonic switch and the computer servers.

9. The system as recited in claim 1 comprising
an agent telephonic unit for receiving voice communications from the telephonic switch, and
wherein the telephonic switch comprises
an audio circuit for establishing voice communications between the agent telephonic unit and the remote computer.

10. The system as recited in claim 1 comprising an agent telephonic unit to receive voice communications from the telephonic switch, and
wherein the remote computer is associated with a subscriber, and
wherein the telephonic switch comprises
an audio circuit for establishing voice communications between the subscriber and the agent telephonic unit.

11. The system as recited in claim 10 comprising
a telephonic unit associated with the subscriber, and wherein
the audio circuit establishes voice communications between the telephonic unit and the agent telephonic unit.

12. The system as recited in claim 11 wherein the telephonic switch comprises
a data link circuit for maintaining a data connection between the telephonic switch and the computer service provider while voice communications are established between the telephonic unit and the agent telephonic unit.

13. A method for interconnecting a remote computer and a computer service provider the computer service provider including a plurality of computer servers, the computer servers of the computer service provider being internally coupled, one-to-another using a wide area network and externally provided with a respective local connection to an automatic call distributor, the method comprising the steps of:

detecting by a telephonic switch of an automatic call distributor agent selection information received from the remote computer and
connecting the remote computer to a selected computer server of the plurality of computer servers of the computer service provider by the telephonic switch through the respective local connection based on the information.

14. The method as recited in claim 13 wherein the step of detecting by the telephonic switch information comprises the step of detecting automatic number identification information.

15. The method as recited in claim 13 wherein the step of detecting by a telephonic switch information comprises the step of detecting dialed number identification service information.

16. The method as recited in claim 13 comprising the step of:
determining from the information whether access to adult materials should be denied.

17. The method as recited in claim 13 comprising the step of:
prompting the remote computer for instructions indicating whether access to adult materials should be denied; and
connecting the remote computer to the computer service provider based on the instructions.

18. The method as recited in claim 13 comprising the step of:
generating reports related to connection of the remote computer to the computer service provider by the telephonic switch.

19. The method as recited in claim 13 comprising the steps of
storing a plurality of advertisements;
selecting one of the plurality of advertisements based on the information received from the remote computer; and
sending the selected one of the plurality of advertisements to the remote computer.

20. A telephonic switch of an automatic call distributor for interconnecting a subscriber associated with a remote computer and a selected computer server of a plurality of computer servers of a computer service provider through a respective external connection of the computer service provider with the selected computer server, such telephonic switch comprising:
a detection circuit of the automatic call distributor for detecting agent selection information received from the remote computer requesting connection to the computer service provider; and
a routing circuit of the automatic call distributor for connecting the remote computer to the selected computer server through the respective external connection of the computer service provider based on the information.

21. The telephonic switch as recited in claim 20 wherein the detection circuit comprises
an adult material circuit for detecting a request to prohibit access to adult material from the remote computer, and wherein
the routing circuit connects the remote computer to the computer service provider based on the request.

22. The telephonic switch as recited in claim 20 comprising
a reporting system for generating reports related to connection of the remote computer to the computer service provider.

23. The telephonic switch as recited in claim 20 comprising an advertisement circuit for storing at least one advertisement, for selecting one of the at least one advertisement based on the information received from the remote computer and for displaying the selected one of the at least one advertisement to the remote computer.

24. The telephonic switch as recited in claim 20 comprises:

an audio circuit for establishing voice communications between the subscriber and an agent telephonic unit associated with the telephonic switch.

25. The telephonic switch as recited in claim 24 comprising:

a data link circuit for maintaining a data link with the computer service provider while voice communications are established between the subscriber and the agent telephonic unit.

* * * * *